(12) United States Patent
Vajda

(10) Patent No.: US 6,173,661 B1
(45) Date of Patent: Jan. 16, 2001

(54) DEAD PLATE ASSEMBLY FOR I.S. MACHINE

(75) Inventor: Vladimir Vajda, Nussbaumen (CH)

(73) Assignee: Emhart Glass S.A., Cham (CH)

( * ) Notice: Under 35 U.S.C. 154(b), the term of this patent shall be extended for 0 days.

(21) Appl. No.: 09/390,262

(22) Filed: Sep. 3, 1999

(51) Int. Cl.$^7$ ...................................................... A47B 9/00
(52) U.S. Cl. ............................................ 108/147; 108/55.3
(58) Field of Search .................................. 108/147, 55.3, 108/57.12, 54.1; 248/565, 574, 577, 601, 621, 631, 669, 346.01

(56) References Cited

U.S. PATENT DOCUMENTS

| | | | |
|---|---|---|---|
| 1,812,861 | * 7/1931 | Chase | 108/57.12 |
| 4,245,826 | * 1/1981 | Wirges | 248/565 X |
| 4,278,031 | * 7/1981 | Dangschat | 108/147 X |
| 4,362,287 | * 12/1982 | Grongstad | 248/565 X |
| 4,374,497 | * 2/1983 | Harmand | 108/147 X |
| 4,854,541 | * 8/1989 | McConnell | 248/565 |
| 5,036,555 | * 8/1991 | Oudt | 248/601 X |

* cited by examiner

Primary Examiner—Jose V. Chen
(74) Attorney, Agent, or Firm—Spencer T. Smith

(57) ABSTRACT

A deadplate assembly for a section of an I.S. machine. The assembly includes a deadplate table onto which bottles made in the section will be periodically placed for cooling. A plenum having an annular top portion is located beneath the deadplate table and this annular top portion has an inner annular sealing surface. An annular seal is secured to the bottom surface of the deadplate table to establish a seal with the plenum. The deadplate table is supported on compressed springs supported by the plenum so that the vertical location of the deadplate table can be adjusted with the screws.

2 Claims, 2 Drawing Sheets

DEAD PLATE ASSEMBLY FOR I.S. MACHINE

The present invention relates to individual section glass forming machines which form glass bottles from individual gobs of molten glass and more particularly to the deadplate assembly for each individual section of the machine.

BACKGROUND OF THE INVENTION

An I.S. machine has a number of identical sections each of which produces a bottle from a gob of molten glass in a two step process. The first step is to form the molten gob into a parison in a blank station and the second step, performed on the parison after it has been pivoted 180° from the blank station to the blow station, is to blow the paison into a bottle. This bottle is removed from the blow station by a takeout and placed on a dead plate which is a horizontal plate having a number of holes through which cool air is blown upwardly to cool the formed bottle. When the bottle has cooled sufficiently to be stable, it is transferred from the deadplate to a conveyor which carries the bottle away from the machine.

The surface of the conveyor is subject to wear and as a result the top surface Lowers over time. Dead plate assemblies have been designed where the deadplate is mounted on a supporting frame and the deadplate and supporting frame are interconnected firmly with four screws. To vertically reposition the deadplate to maintain the deadplate surface aligned with the surface of the conveyor, these four screw have to be unscrewed, the deadplate must be removed from the windbox, shim plates must be located between the windbox and the deadplate, and the four screws must be remounted. Such systems tend to be complicated.

OBJECT OF THE INVENTION

It is accordingly an object of the present invention to provide an improved dead plate assembly for a section of an I.S. machine.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE PREFERRED EMBODIMENT

Figure 1:
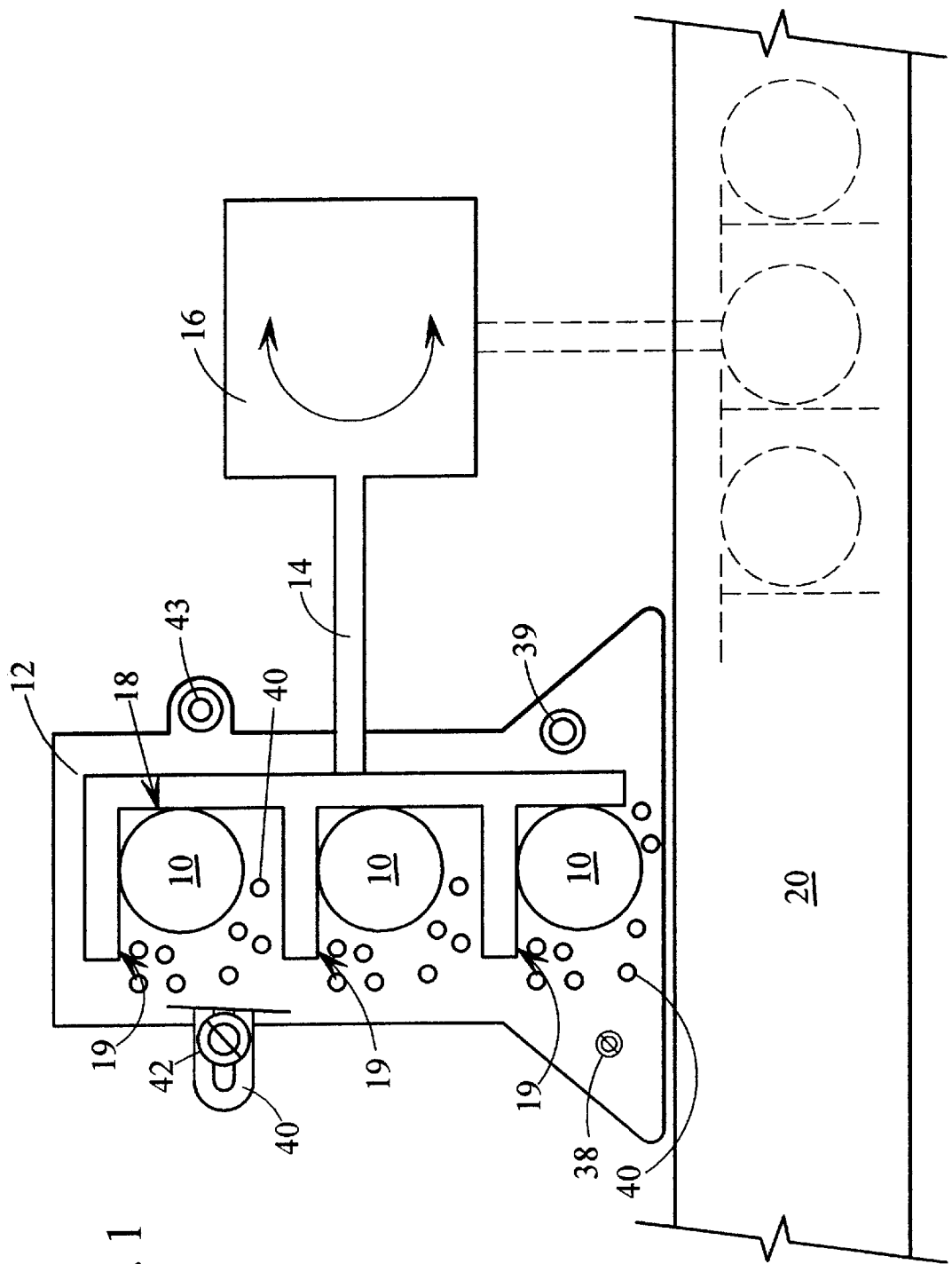
FIG. 1 is a schematic showing of a pusher mechanism for displacing containers from a deadplate of a section of an I.S. machine onto the machine conveyor.

A plurality (here three) of formed bottles 10 are shown deposited on a deadplate table 12 of a deadplate assembly of one section of an I.S. (individual section) machine which can have one or more sections but normally has 6, 8, 10 or 12 identical sections. These bottles are placed on the deadplate table so that they can be cooled sufficiently to be stable enough to be pushed. The rod 14 of an air cylinder 16 is shown in the extended position and a ware handler 18 including three pockets 19 is secured to the free end of the rod. When the air cylinder and the extended rod are rotated 90° following the cooling of the bottles, the bottles will be pushed from the deadplate table onto a machine conveyor 20.

Figure 2:
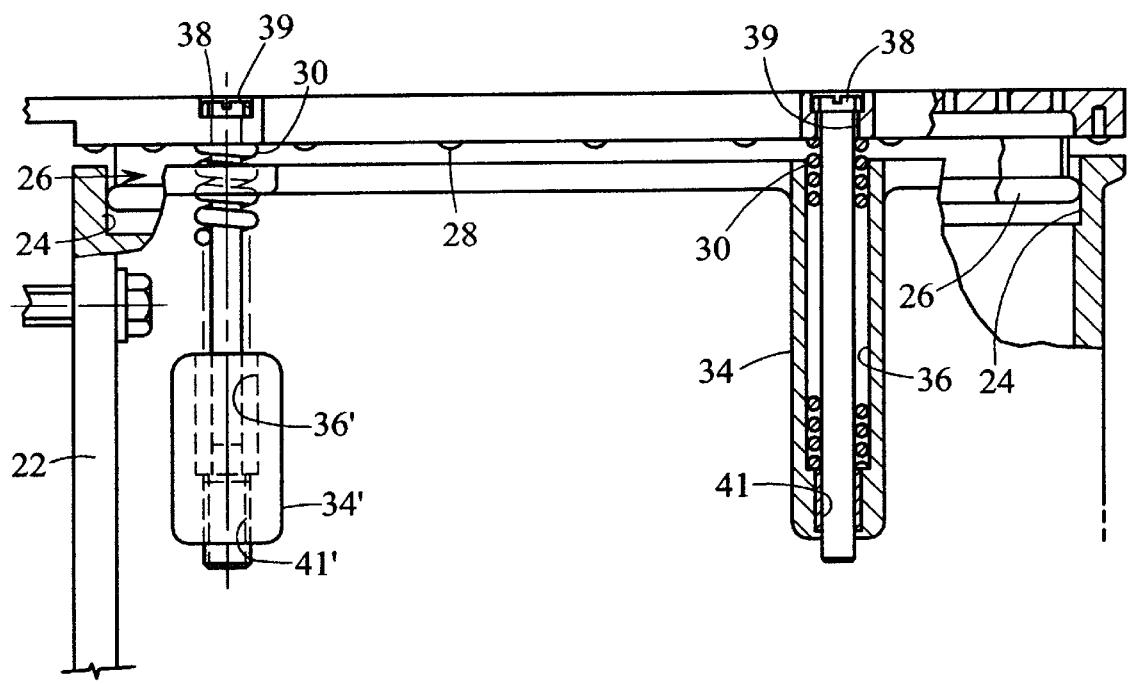
FIG. 2 is a side cross sectional view of a de plate assembly made in accordance with the teachings of the present invention.

As can be seen from FIG. 2 the deadplate assembly additionally has a plenum 22 in the form of an annular housing which receives pressurized cooling air. The plenum has an interior annular sealing surface 24 which cooperates with a correspondingly configured sealing insert 26 which is secured to the bottom surface of the deadplate table with suitable grooved pins 28. The deadplate table is supported on four springs 30 which are supported within spring housings integral with the plenum. As shown in FIG. 2, a spring housing can have a first style 34 extending downwardly from the top of the plenum and having a cylindrical vertical blind bore 36 open at the top and threaded holes 41 in the bottom or it can be a shorter version 34' also integral with the plenum, having a blind bore 36' open at the top and threaded holes 41' in the bottom. Three compression screws are located in three of these blind bores and extend through two holes 39 at the end of the deadplate proximate the conveyor and one of the two holes 43 remote from the conveyor. Second hole 43 receives screw 42 which fixes slotted ear of pocket air guide 40 from above. Which of threaded holes 43 will be used for this purpose depends on the delivery direction of the conveyor. The deadplate table accordingly floats on the compressed springs and the height of the deadplate table can be adjusted by selectively varying the compression of these springs.

In operation, cooling air is supplied to the plenum under pressure and escapes through a number of vertical holes 40 in the deadplate table. This cooling air cools the red hot bottles placed periodically on the deadplate table to stabilize them so that they can be pushed onto the conveyor without being damaged.

What is claimed is:

1. A deadplate assembly for a section of an I.S. machine comprising
   a deadplate table onto which bottles made in the section will be placed,
   said deadplate table including a number of vertically extending holes and having a bottom surface,
   a plenum having an annular top portion beneath said deadplate table, said annular top portion having a inner annular sealing surface,
   an annular seal secured to the bottom surface of said deadplate table, the bottom surface of said deadplate table and said seal being selectively configured to establish a seal with said inner annular sealing surface,
   a plurality of vertical spring housings integral with said plenum each having a thread receiving hole,
   a corresponding plurality of compression springs housed by said spring housings and having a length selected to project in the uncompressed state upwardly beyond said plenum, and
   a corresponding number of screws for threaded insertion into the threaded holes for interconnecting said deadplate table and said plenum,
   whereby the vertical location of said deadplate table can be adjusted with said screws.

2. A deadplate assembly for a section of an I.S. machine according to claim 1, wherein there are four screws.

* * * * *